(12) United States Patent
Manabe

(10) Patent No.: US 11,982,007 B2
(45) Date of Patent: May 14, 2024

(54) GASKET FOR ELECTROLYSIS VESSELS, AND ELECTROLYSIS VESSEL USING SAME

(71) Applicant: DE NORA PERMELEC LTD, Fujisawa (JP)

(72) Inventor: Akiyoshi Manabe, Fujisawa (JP)

(73) Assignee: DE NORA PERMELEC LTD, Fujisawa (JP)

( * ) Notice: Subject to any disclaimer, the term of this patent is extended or adjusted under 35 U.S.C. 154(b) by 0 days.

(21) Appl. No.: 17/597,107

(22) PCT Filed: Jul. 17, 2020

(86) PCT No.: PCT/JP2020/027827
§ 371 (c)(1),
(2) Date: Dec. 27, 2021

(87) PCT Pub. No.: WO2021/015120
PCT Pub. Date: Jan. 28, 2021

(65) Prior Publication Data
US 2022/0316079 A1  Oct. 6, 2022

(30) Foreign Application Priority Data
Jul. 19, 2019 (JP) ................. 2019-133634

(51) Int. Cl.
*C25B 9/60* (2021.01)
*C25B 1/46* (2006.01)
(Continued)

(52) U.S. Cl.
CPC .............. *C25B 9/60* (2021.01); *C25B 1/46* (2013.01); *C25B 9/05* (2021.01); *C25B 9/19* (2021.01); *C25B 9/23* (2021.01); *C25B 9/63* (2021.01); *C25B 11/03* (2013.01); *C25B 11/052* (2021.01); *C25B 13/02* (2013.01)

(58) Field of Classification Search
CPC .... C25B 1/04; C25B 1/46; C25B 9/19; C25B 9/21; C25B 9/23; C25B 9/77; C25B 11/02; C25B 11/03; C25B 11/031; C25B 11/032
See application file for complete search history.

(56) References Cited

U.S. PATENT DOCUMENTS 4,212,714 A * 7/1980 Coker ................ C25B 9/19
204/263
4,851,099 A * 7/1989 Brereton ............ C25B 9/73
204/266
(Continued)

FOREIGN PATENT DOCUMENTS

CN  102459709  5/2012
JP  10-121284  5/1998
(Continued)

OTHER PUBLICATIONS

Chinese Office Action, issued in the corresponding Chinese patent application No. 20208052363.3, dated Apr. 26, 2022, 8 pages, showing the references cited in the Office Action.
(Continued)

*Primary Examiner* — Salil Jain
(74) *Attorney, Agent, or Firm* — HSML, P.C.

(57) ABSTRACT

There are provided an electrolyzer gasket, which can accommodate and hold a separator inside an electrolyzer by a simple handling, can more surely prevent leakage of an electrolyte and an electrolytically generated gas from the inside of the electrolyzer, can keep the separator in such a state that the separator is held at a position that is in contact with one of electrodes and is located along the electrode and therefore can suppress damage of the separator and makes it possible to use the separator stably for a long period of time, and an electrolyzer. An electrolyzer gasket including a picture-frame-shaped thin-plate-like frame having a first
(Continued)

surface being in contact with an anode metal frame and a second surface being in contact with a cathode metal frame, wherein the gasket has a structure in which a notch having a difference in level of approximately the same thickness as the thickness of the separator, the notch obtained by thinly scraping off, in a uniform thickness, a region including the edge on the anode chamber side or the cathode chamber side, is formed on any one of the first surface and the second surface, and the edge part of the separator is accommodated and held in the notch, and an electrolyzer using the electrolyzer gasket.

14 Claims, 7 Drawing Sheets

(51) Int. Cl.
*C25B 9/05* (2021.01)
*C25B 9/19* (2021.01)
*C25B 9/23* (2021.01)
*C25B 9/63* (2021.01)
*C25B 11/03* (2021.01)
*C25B 11/052* (2021.01)
*C25B 13/02* (2006.01)

(56) References Cited

U.S. PATENT DOCUMENTS

| | | | |
|---|---|---|---|
| 5,876,583 | A | 3/1999 | Brambilla et al. |
| 2012/0145559 | A1* | 6/2012 | Asaumi ................... C25B 1/16 205/624 |
| 2016/0153100 | A1* | 6/2016 | Nakagawa ................ C25B 9/77 204/252 |
| 2017/0233881 | A1* | 8/2017 | Masel ................. H01M 8/1023 204/252 |
| 2020/0039848 | A1 | 2/2020 | Oiwa et al. |
| 2020/0102663 | A1* | 4/2020 | Xu .......................... C25B 13/02 |
| 2020/0340130 | A1* | 10/2020 | Tanaka ..................... C25B 9/77 |
| 2021/0054514 | A1* | 2/2021 | Tanaka .................... C25B 13/02 |

FOREIGN PATENT DOCUMENTS

| | | | |
|---|---|---|---|
| JP | 2002-332586 | 11/2002 | |
| JP | 2004-285427 | 10/2004 | |
| JP | 2008-196014 | 8/2008 | |
| JP | 2011-006767 | 1/2011 | |
| WO | 2014-178317 | 11/2014 | |
| WO | WO-2014178317 A1 * | 11/2014 | .......... C02F 1/46104 |
| WO | 2018/181617 | 10/2018 | |

OTHER PUBLICATIONS

International Search Report, issued in the corresponding PCT application No. PCT/JP2020/027827, dated Sep. 29, 2020, 5 pages (including translation).

Extended European Search Report, issued in the corresponding European patent application No. 20844759.9, dated Aug. 14, 2023, 9 pages.

Akiyoshi Manabe, "Main Effective Parts of Electrolyzer Performance and Alkaline Water Electrolysis", Molten Salts a, vol. 59, No. 3, May 2016, 8 pages (English Abstract and explanation of figures included).

* cited by examiner

GASKET FOR ELECTROLYSIS VESSELS, AND ELECTROLYSIS VESSEL USING SAME

TECHNICAL FIELD

The present invention relates to an electrolyzer gasket and an electrolyzer using the same.

BACKGROUND ART

As an electrolyzer used for alkaline water electrolysis, pure water electrolysis, electrolysis of unpurified water, brine electrolysis, chloride aqueous solution electrolysis, bromide aqueous solution electrolysis, hydrochloric acid aqueous solution electrolysis, sulfuric acid aqueous solution electrolysis, and the like, an electrolyzer in which a separator is provided between an anode and a cathode, and the anode and cathode are isolated by the separator is often used. An electrolyte to be supplied in the electrolyzer, electrolytically generated gases, such as a hydrogen gas, an oxygen gas, a chlorine gas, and a halogen gas, which are generated by electrolysis, and the electrolyte in the electrolyzer must not leak from the edge part of the separator to the outside of the electrolyzer. If an electrolytically generated gas, an electrolyte, or the like leaks, continuous operation of the plant cannot be performed, and further, problems in terms of the operation manager and the environment may occur.

Conventionally, in the electrolyzer as described above, in order to prevent the leakage of an electrolyte, an electrolytically generated gas, or the like from the edge part of the separator for the electrolyzer, two thin-plate-like gaskets, or four or two O-rings are disposed between the anode and the cathode to prevent the leakage of an electrolytically generated gas, an electrolyte, or the like and sandwich the separator by these sealing elements.

Figure 6:
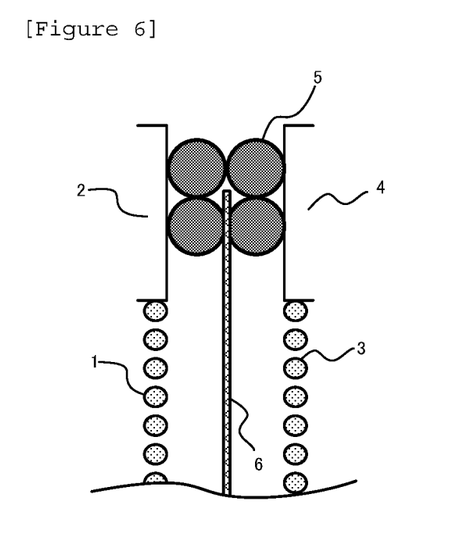
FIG. 6 is a schematic diagram showing a configuration of one example of a conventional electrolyzer O-ring.

In the electrolyzer as described above, for example, when four O-rings 5 shown in FIG. 6 are used, the separator is sandwiched by two O-rings 5 on the electrolyzer side, and the electrolyte is prevented from leaking outside the electrolyzer by two O-rings 5 on the outer periphery side of the electrolyzer. Note that when an ion exchange membrane is used as a separator, the ion exchange membrane is like a film, and there is no leakage due to oozing out of the liquid, which occurs in the case of using the separator, and therefore the electrolyzer is sealed with only two O-rings.

Figure 7A:
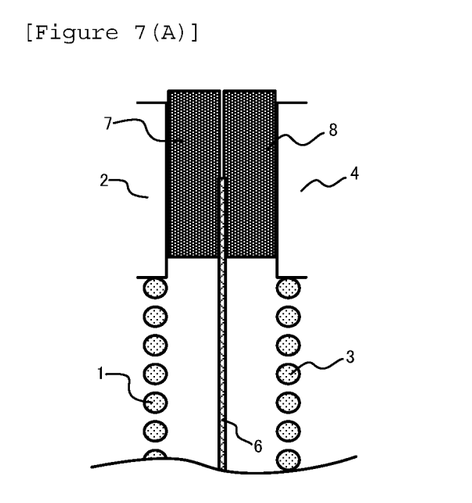
FIG. 7(A) is a schematic diagram showing a configuration of one example of a conventional electrolyzer gasket.

Further, in the electrolyzer as described above, Patent Literature 1 and Patent Literature 2 each describing a conventional method using a thin-plate-like gasket as a sealing element disclose a structure shown in FIG. 7(A). In this method, an anode metal frame 2 to which an anode 1 is attached is provided with an anode gasket 7, a cathode metal frame 4 to which a cathode 3 is attached is provided with a cathode gasket 8, and a separator 6 is sandwiched by the one pair of (two) gaskets 7 and 8.

However, as a result of studies conducted by the present inventors, it has been found that in the electrolyzer described above, when the separator 6 is sandwiched by a structure using the O-rings 5 or a structure using the two gaskets 7 and 8, particularly when the separator 6 forming the electrolyzer is a porous membrane, there is a defect as follows. In any of the above-mentioned structures, holding the separator 6 is performed by using a plurality of sealing elements and sandwiching the edge part of the separator 6 by these elements, and at the same time, the leakage of an electrolyte or an electrolytically generated gas from the electrolyzer is prevented, and airtightness in the electrolyzer is maintained. For this reason, a plurality of sealing elements, such as gaskets and O-rings, is needed. Particularly in a filter press type electrolyzer in which a plurality of electrolyzers is assembled on top of each other, the number of sealing elements such as gaskets increases. When the number of sealing elements increases, for example, there have been some troubles, such as protrusion caused by positional deviation of the gaskets and liquid leakage due to the protrusion or the like. When a configuration, as shown in FIG. 7(A), in which the separator is sandwiched using two gaskets is adopted, it takes time and effort to accommodate the membrane in the gaskets in assembling a large electrolyzer. Further, the separator can also be held in a state of being pulled out of the electrolyzer from between the two gaskets. However, in the case where such a configuration using two gaskets is adopted, when a diaphragm (separator) is used instead of an ion exchange membrane, an electrolyte or an electrolytically generated gas may leak out of the electrolyzer through a small gap formed by the two gaskets, as shown in FIG. 7(B).

Figure 8:
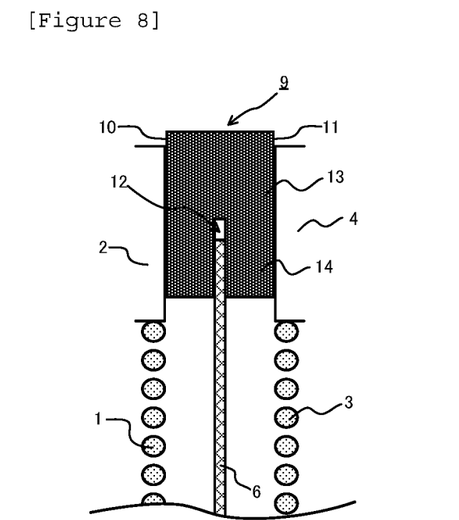
FIG. 8 is a schematic diagram showing a configuration of still another example of a conventional electrolyzer gasket.

Further, in the electrolyzer as described above, as another conventional method using a gasket, there is the following structure disclosed in Patent Literature 3. Specifically, a structure formed using one gasket 9, as shown in FIG. 8, is known. The gasket 9 has a first surface 10 being in contact with the anode metal frame 2 and a second surface 11 being in contact with the cathode metal frame 4 and is provided with a slit 12 that forms a ring shape and opens toward the inside of the electrolyzer. In more detail, as shown in FIG. 8, an original part 13 is set from the longitudinal upper end to the middle part of the gasket 9, the lower part of the original part 13 is set as a slit-forming part 14, and in the central part of the slit-forming part 14, the slit 12 having a structure such that it extends approximately in parallel with the fast surface 10 and the second surface 11 of the gasket 9 and opens toward the inside of the electrolyzer is provided. In this example, the edge part of the separator 6 is accommodated in the slit 12, and the separator 6 is held by the gasket 9 having the above-described structure.

Figure 7B:
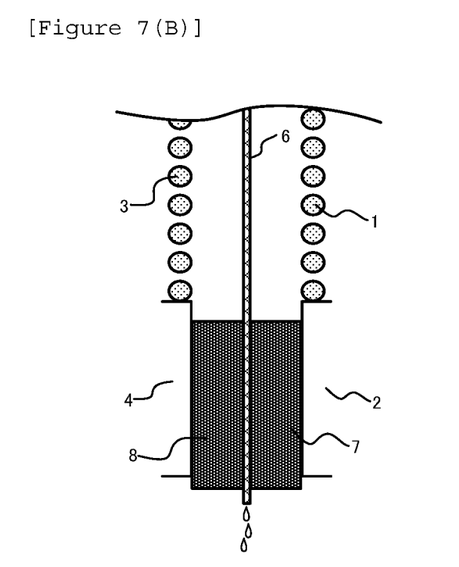
FIG. 7(B) is a schematic diagram showing a configuration of another example of a conventional electrolyzer gasket and showing a situation where an electrolyte leaks outside an electrolyzer.

According to the gasket 9 having the above-described structure, the gasket 9 is composed of a single element, and therefore, for example, there is no risk of the leakage of an electrolyte or an electrolytically generated gas from the edge part of the gasket, which occurs when the separator is sandwiched by a plurality of gaskets as shown in FIG. 7(B). For this reason, when a gasket having the structure shown in FIG. 8 is used, the leakage rate of an electrolyte or an electrolytically generated gas can be reduced as compared with the case of using a gasket having the structure shown in FIG. 7(A).

However, as a result of studies conducted by the present inventors, it has been found that when the gasket of the structure shown in FIG. 8 is used, there are problems described below. When a separator is held by a gasket having a structure as shown in FIG. 8, it is necessary to form the slit 12 inside the thin-plate-like (sheet-like) gasket 9 in such a way as to extend in parallel with the first surface 10 and the second surface 11 of the gasket 9. On the other hand, in order to further reduce the leakage rate of an electrolyte or an electrolytically generated gas, the accuracy of the length and thickness of the slit 12 to be formed is required, and therefore high skill is required for production. Further, when the separator is held in a gasket having the structure shown in FIG. 8, it is necessary to firmly accommodate the edge part of the thin-plate-like separator 6 deep inside the slit 12 in such a way as not to form a gap, but it is not easy to do so. For this reason, it takes time and effort to install the separator, and there is also a problem that workability is poor in addition to the difficulty in production.

Patent Literature 3 mentioned above describes that the following structure is adopted in order to solve the above-described defect. There is disclosed a structure provided with a division part that continuously divides, in a first surface and a first part, the first portion into the surfaces that separately form the slit, or a division part that continuously divides, in a second surface and a second part, the second part into the surfaces that separately form the slit. When the separator is accommodated in the slit, the first part or the second part is turned up by this division part to accommodate the separator in the slit. However, in order to be able to install the separator to the gasket in this way, a division part must be formed at the slit, and the structure of the gasket is considerably complicated. Accordingly, in the case of adopting a structure as described above, means for improving the workability of installing the separator to the gasket increases the difficulty in production, making the work more complicated, and the production cost of the gasket increases. Furthermore, in the above-described configuration, when the difference in the thickness of the separator and the slit is small, it is extremely difficult to firmly hold the separator deep inside the slit of the gasket.

Furthermore, in the gasket of the structure described in Patent Literature 2 mentioned above, there is no problem as described above, but according to studies conducted by the present inventors, there are other important technical problems as follows. In the gasket of the structure described in Patent Literature 2, when the separator is installed to the gasket, the separator is disposed in the middle of the interval formed by the anode and the cathode facing each other. Thus, when the separator is held using the above-described gasket, the separator is structurally in a state where it is not in contact with any of the anode and the cathode, as shown in FIG. 7(A). For this reason, the thin sheet-like separator is unlikely to be fixed firmly, an unstable state where the separator is bent left and right continues during electrolysis operation, and the separator always causes a contact rubbing phenomenon with the anode and cathode, and therefore it is not possible to prevent breakage of the separator at an early stage. That is, in the above-described conventional techniques, there is a defect related to the durability of the held separator in addition to the above-mentioned problems.

CITATION LIST

Patent Literature

Patent Literature 1: Japanese Patent Laid-Open No. 2002-332586
Patent Literature 2: Japanese Patent Laid-Open No. 2011-6767
Patent Literature 3: International Publication No. WO 2014/178317

SUMMARY OF INVENTION

Technical Problem

An object of the present invention is to provide an electrolyzer gasket having a highly practical value as described below, and an electrolyzer using the same. That is, the electrolyzer gasket has a simple structure and can easily be produced; a separator can simply be attached by an extremely easy handling (action) using the gasket; the separator can stably be held without being bent during electrolysis operation, and therefore the electrolyzer gasket has excellent durability of the separator during the electrolysis operation and can effectively prevent leakage of an electrolyte or an electrolytically generated gas from the electrolyzer, which is a basic function of a gasket.

Solution to Problem

The above-described object is achieved by the present invention described below.

The present invention provides the following electrolyzer gasket as a first solution.

1 An electrolyzer gasket incorporated in an electrolyzer comprising: an anode; a cathode; and a sheet-like separator that isolates the anode and the cathode, the electrolyzer gasket being for holding the separator, wherein the electrolyzer has: a picture-frame-shaped anode metal frame having an opening for forming an anode chamber in a central part; and a cathode metal frame having the same shape as the anode metal frame and having an opening for forming a cathode chamber in a central part, the anode is attached at the opening of the anode metal frame, the cathode is attached at the opening of the cathode metal frame, and the electrolyzer gasket is sandwiched in a tight state between the anode metal frame and the cathode metal frame, the electrolyzer gasket comprises a single picture-frame-shaped thin-plate-like frame having approximately the same shape as the anode metal frame and the cathode metal frame, the picture-frame-shaped thin-plate-like frame has: a first surface being in close contact with the anode metal frame; and a second surface being in close contact with the cathode metal frame, and has a structure obtained by forming, on any one of the first surface and the second surface, a notch having a difference in level of approximately the same thickness as the thickness of the separator, the notch formed by thinly scraping off, in a uniform thickness, a region including an edge on the anode or the cathode of the thin-plate-like frame, and an edge part of the separator is accommodated in a gap formed between the notch and the anode metal frame or the cathode metal frame, and the separator is held in a state of being nearer to the surface of the anode or the surface of the cathode.

The present invention provides the following electrolyzer gaskets as preferred embodiments of the above-described electrolyzer gasket.

2 The electrolyzer gasket according to 1, wherein a gasket stopper having an electrical insulation property is further attached in a state of being pressed on an outer peripheral surface of the electrolyzer gasket.

3 The electrolyzer gasket according to 1 or 2, wherein the electrolyzer gasket is formed with a material comprising an elastic body having corrosion resistance against an electrolyte and an electrolytically generated gas.

4 The electrolyzer gasket according to any one of 1 to 3, wherein an activated anode coating is applied on a separator side of the anode, or an anode fine mesh on which an activated anode coating is applied is attached to a separator side of the anode, and/or a activated cathode coating is applied on a separator side of the cathode, or a cathode fine mesh on which a activated cathode coating is applied is attached to a separator side of the cathode.

5 The electrolyzer gasket according to 4, wherein a spring material is attached between the anode fine mesh and the anode and/or between the cathode fine mesh and the cathode to achieve a zero gap between the anode and the cathode.

6 The electrolyzer gasket according to any one of 1 to 5, wherein each of the anode and the cathode comprises any one of materials independently selected from the group consisting of an expanded mesh, a perforated plate, a metal wire, and electrically conductive electrode materials each having a shape similar to any one of the expanded mesh, the perforated plate, and the metal wire, and each having a large number of holes.

7 The electrolyzer gasket according to any one of 1 to 6, wherein an anode chamber frame for forming the anode chamber is connected to a rear surface of the anode metal frame, and a cathode chamber frame for forming the cathode chamber is connected to a rear surface of the cathode metal frame.

8 The electrolyzer gasket according to 7, wherein the anode metal frame is formed as a part of the anode chamber frame, and the cathode metal frame is formed as a part of the cathode chamber frame.

9 The electrolyzer gasket according to any one of 1 to 8, wherein the separator is held in a state where the whole surface of one surface of the separator, excluding the edge part accommodated in the gap, is in contact with the anode or the anode fine mesh attached to the anode, or in a state where the whole surface of one surface of the separator, excluding the edge part accommodated in the gap, is in contact with the cathode or the cathode fine mesh attached to the cathode.

10 The electrolyzer gasket according to any one of 1 to 9, wherein
  each of the anode, the anode metal frame, the anode chamber frame, the cathode, the cathode metal frame, and the cathode chamber frame comprises a material comprising at least one selected from the group consisting of nickel, stainless steel, iron, and alloys thereof,
  the separator comprises a porous separator having aqueous solution permeability,
  each of electrolytes to be introduced into the anode chamber and the cathode chamber respectively is a caustic alkali metal aqueous solution having a common composition, and
  the electrolyzer is an alkaline water electrolyzer.

11 The electrolyzer gasket according to any one of 1 to 9, wherein
  each of the anode, the anode metal frame, and the anode chamber frame comprises titanium or a titanium alloy,
  each of the cathode, the cathode metal frame, and the cathode chamber frame comprises a material comprising at least one selected from the group consisting of nickel, stainless steel, iron, and alloys thereof,
  the separator comprises a cation exchange membrane,
  electrolytes to be introduced into the anode chamber and the cathode chamber respectively comprise an anolyte and a catholyte respectively,
  the catholyte comprises a caustic alkali metal aqueous solution,
  the anolyte comprises a halogenated alkali metal aqueous solution, and
  the electrolyzer is a brine electrolyzer.

The present invention provides the following electrolyzers as other embodiments.

12 An electrolyzer comprising the electrolyzer gasket according to any one of 1 to 11.

13 The electrolyzer according to 12, further comprising constitution of performing electrolysis while pressurizing an electrolyte.

14 An electrolyzer comprising the electrolyzer gasket according to any one of 1 to 11, wherein the first surface that forms the gasket is bonded, with an adhesive, to the anode frame which is in contact with the first surface, or the second surface that forms the gasket is bonded to the cathode frame which is in contact with the second surface.

Advantageous Effects of Invention

According to the present invention, it can be realized to provide an electrolyzer gasket having a highly practical value as described below, and an electrolyzer using the same. That is, the electrolyzer gasket has a simple structure and can easily be produced; a separator can simply be attached by an extremely easy handling (action) using the gasket; the separator can stably be held without being bent during electrolysis operation, and therefore the electrolyzer gasket has excellent durability of the separator during the electrolysis operation and can effectively prevent leakage of an electrolyte or an electrolytically generated gas from the electrolyzer, which is a basic function of a gasket.

In detail, according to the present invention, configuring the structure of the electrolyzer gasket in such a way as to have a particular notch as described below makes it possible to provide an electrolyzer gasket being such that: the separator can stably be held by accommodating the edge part (end part) of the separator into a desired state in the notch; the separator can simply be attached because the handling required for holding the separator is easy, and the gasket has therefore excellent workability; and the production cost is low. That is, the above-described effects can be obtained by configuring a structure in which a notch, which is described below, is formed. That is, the structure is such that when the electrolyzer gasket including a single picture-frame-shaped thin-plate-like frame having approximately the same shape as the anode metal frame and the cathode metal frame is incorporated into an electrolyzer, a notch having a difference in level of approximately the same thickness as the thickness of the separator, the notch formed by thinly scraping off, in a uniform thickness, a region including an edge on the anode or the cathode of the thin-plate-like frame, is formed on either the first surface being in contact with the anode metal frame or the second surface being in contact with the cathode metal frame.

According to the present invention, by applying the electrolyzer gasket having a notch of the above-described particular structure to an electrolyzer, the edge part of the separator is accommodated in a gap formed between the notch and the anode metal frame or the cathode metal frame, and therefore the central part of the accommodated separator is held on either the surface of the anode and the surface of the cathode in a nearer state, so that a bend, a wrinkle, or torsion is less likely to occur to the separator, and it is possible to hold the separator stably in a normal state for a long period of time without allowing an unreasonable load to apply or causing damage to the separator.

Further, when the electrolyzer gasket of the present invention is applied to an electrolyzer, the whole surface of one surface of the separator, excluding the edge part accommodated in the gap, is held in a state of being in contact with the anode or the anode fine mesh attached to the anode, or being in contact with the cathode or the cathode fine mesh attached to the cathode, and is not held in an unstable state in the middle of the anode and the cathode, which is different from the case where a conventional gasket is used. For this reason, by applying the electrolyzer gasket of the present invention to an electrolyzer, a bend, a wrinkle, or torsion is less likely to occur to the held separator, and therefore the above-described effect of holding the separator stably in a normal state for a long period of time without allowing an unreasonable load to apply or causing damage to the separator is enhanced.

DESCRIPTION OF EMBODIMENTS

Hereinafter, preferred embodiments of the present invention will be described, but the present invention is not limited to the following embodiments. In describing the present invention in detail, an electrolyzer gasket of the present invention will be first described with reference to FIG. 1 that illustrates one example schematically showing the structure of the electrolyzer gasket of the present invention.

Figure 1:
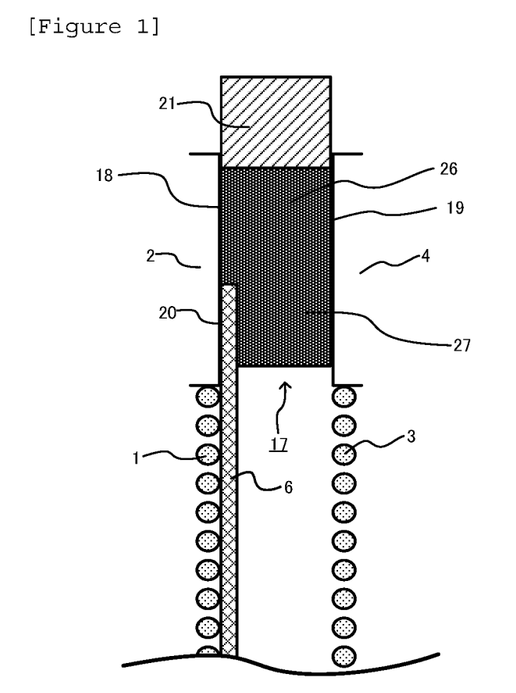
FIG. 1 is a schematic diagram for explaining a configuration of one example of an electrolyzer gasket of the present invention.
Figure 5:
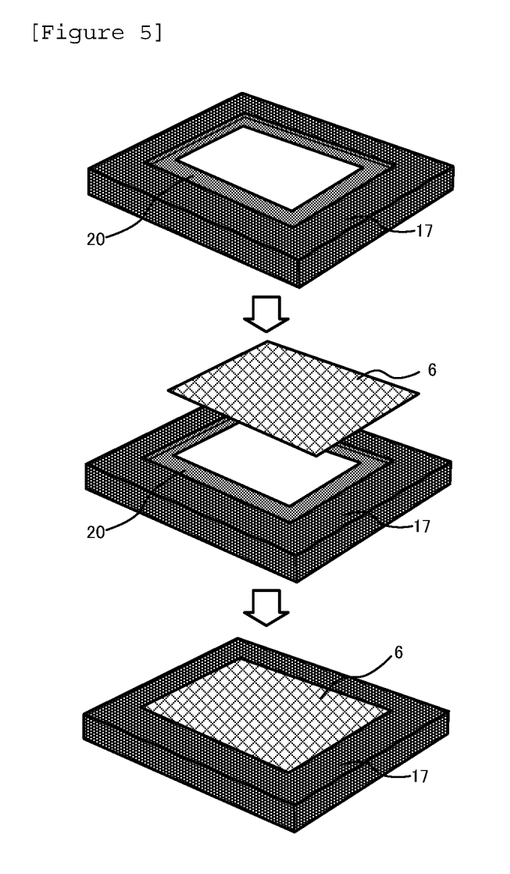
FIG. 5 is a schematic diagram explaining one example of a method of holding a separator in an electrolyzer gasket of the present invention.

As shown in FIG. 1, an electrolyzer gasket 17 of the present invention has a first surface 18 being in contact with an anode metal frame 2 and a second surface 19 being in contact with a cathode metal frame 4, and the electrolyzer gasket 17, the anode metal frame 2, and the cathode metal frame 4 all have an opening in the central part, and have a shape of a picture-frame-shaped square, circle, or the like. The electrolyzer gasket of the present invention, exemplified in FIG. 1, has a structure obtained by forming a notch 20 having a difference in level of approximately the same thickness as the thickness of a separator 6, the notch formed, on the first surface 18 of the electrolyzer gasket 17 composed of a picture-frame-shaped thin-plate-like frame, by thinly scraping off, in a uniform thickness, a region including an edge on the anode of the thin-plate-like frame from near the center of the thin-plate-like frame to the edge on the anode chamber side. As a result, as shown in FIG. 1 and FIG. 5, when the electrolyzer gasket of the present invention is used for an electrolyzer, the edge part of the separator 6 is easily accommodated in the inside (level difference part) of the notch 20 and is in a state of being strongly held in a gap between the electrolyzer gasket 17 and the anode metal frame 2. In the example of FIG. 1, the notch part 20 is provided on the first surface 18 being in contact with the anode metal frame 2, but instead, a structure in which the notch 20 is provided on the second surface 19 being in contact with the cathode metal frame 4 may be configured.

Numeral 21 in FIG. 1 denotes an insulating stopper, which is an element for preventing the up and down movement of the electrolyzer gasket 17 and preventing the gasket from protruding from the metal frame when the separator 6 is held. As shown in FIG. 1, the stopper is attached in a state of being in close contact with the outer peripheral surface of the electrolyzer gasket 17. The shape of the stopper 21 conforms to the shape of the electrolyzer and has a circular or rectangular frame structure. The stopper 21 can improve the airtightness in the electrolyzer 24 (see FIG. 2, etc.) by preventing displacement of the gasket, and therefore the stopper 21 is effective means in the case of a large capacity electrolyzer in which a large number of cells are stacked or in the case of performing operation under pressurization. Note that FIG. 2 describes an example where the electrolyzer is assembled with a pair of an anode chamber and a cathode chamber, but the same applies to an electrolyzer in which a plurality of anode chambers and cathode chambers is stacked.

A plate-like or mesh-like anode 1 composed of any one of materials selected from the group consisting of an expanded mesh, a perforated plate, a metal wire, and electrically conductive electrode materials each having a shape similar to any one of the expanded mesh, the perforated plate, and the metal wire, and each having a large number of holes is attached at the opening formed in the central part of the anode metal frame 2. Further, a plate-like or mesh-like cathode 3 composed of any one of materials selected from the group consisting of an expanded mesh, a perforated plate, a metal wire, and electrically conductive electrode materials each having a shape similar to any one of the expanded mesh, the perforated plate, and the metal wire, and each having a large number of holes is attached at the opening formed in the central part of the cathode metal frame 4. The separator 6 is installed in such a way that the edge part (end part) thereof is held in the previously described notch 20 of the electrolyzer gasket 17 and the whole surface of one surface of the separator 6 excluding the held part is in a state of being in contact with the anode 1.

Figure 3:
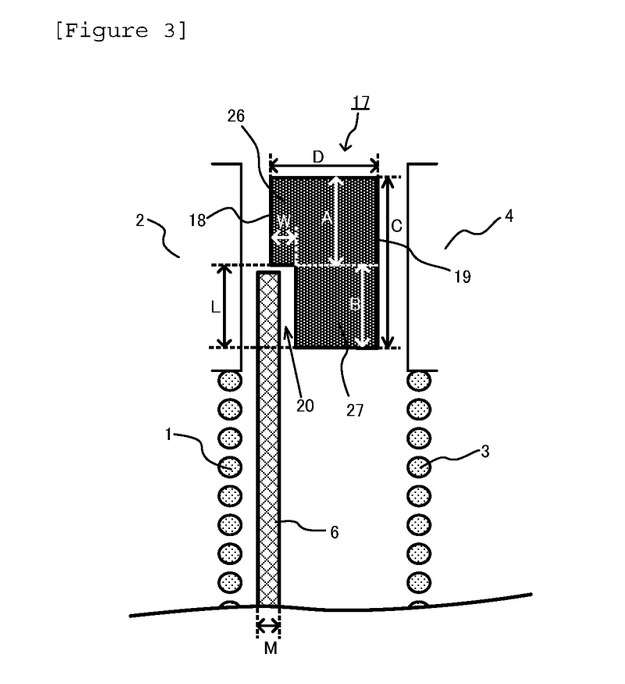
FIG. 3 is a schematic diagram for explaining that a separator is held using an electrolyzer gasket of the present invention.

FIG. 3 is a schematic diagram for explaining a configuration of holding the separator 6 in the electrolyzer gasket 17 of the present invention. The electrolyzer gasket 17 in the example shown in FIG. 3 is composed of a single picture-frame-shaped thin-plate-like frame, and the notch 20 in a state where a region from near the center of the frame toward the edge on the anode chamber side to the edge is thinly scraped off in a uniform thickness is formed on one surface (surface on anode) of the frame. The notch 20 has a structure having approximately the same thickness (difference in level) as the thickness of the separator 6. As shown in FIG. 3, the outer periphery part of the separator 6 is accommodated in the gap formed between the anode metal frame 2 and the notch 20, and is in a state of being accommodated in the notch 20. The picture-frame-shaped sheet-like frame that forms the electrolyzer gasket 17 may have approximately the same shape as the anode metal frame and the cathode metal frame, and examples of the shape of the appearance include a rectangular shape and a circular (ring) shape.

Hereinafter, embodiments of the present invention will be described.

First Embodiment

Figure 2:
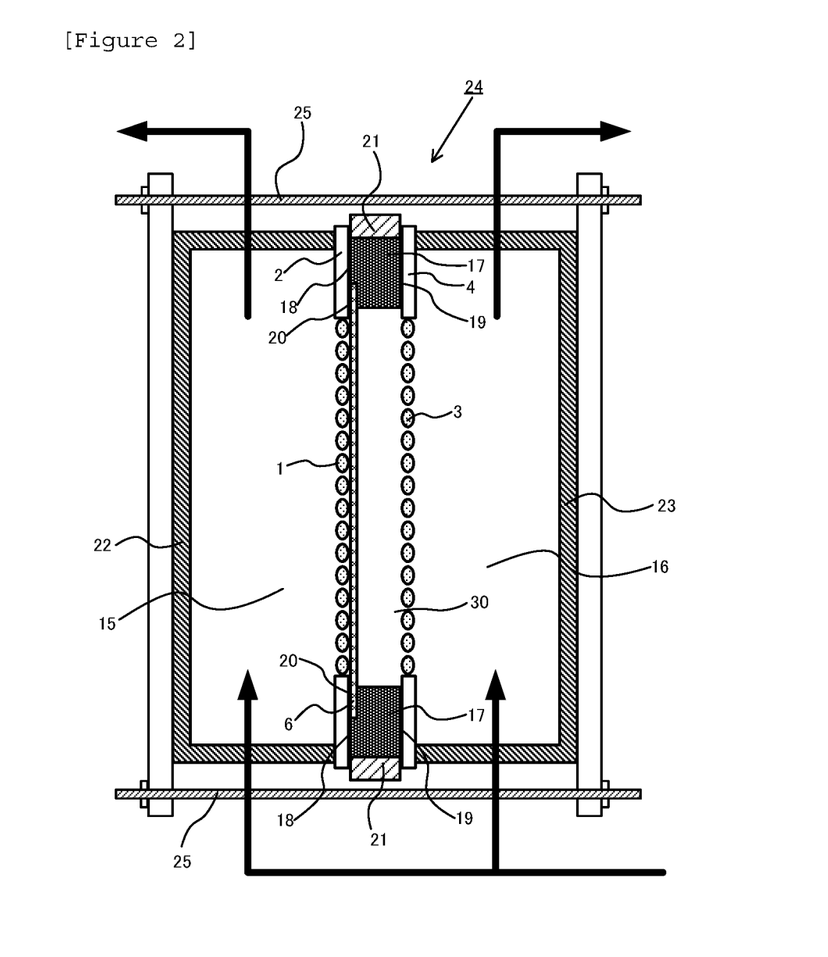
FIG. 2 is a schematic diagram for explaining one example of an electrolyzer using an electrolyzer gasket of the present invention.

FIG. 2 is a schematic section view for explaining the first embodiment of the electrolyzer gasket of the present invention, used for an alkaline water electrolyzer 24 as an electrolyzer. In alkaline water electrolysis which is performed using the alkaline water electrolyzer 24, a 25%-by-mass to 35%-by-mass KOH aqueous solution or NaOH aqueous solution is used as an electrolyte. When this electrolyte is supplied to an anode chamber 15 and a cathode chamber 16, and electrolysis is performed, the electrolyte and an oxygen gas are discharged outside the system from the anode chamber 15, and the electrolyte and a hydrogen gas are discharged outside the system from the anode chamber 16. The discharged electrolytes are mixed outside the system and circulated into the anode chamber 15 and the cathode chamber 16, and thus continuous electrolysis is performed.

As exemplified in FIG. 2, the alkaline water electrolyzer 24 of the present invention has an anode metal frame 2, an anode 1 attached to the anode metal frame 2, the anode chamber 15 including the anode 1, a cathode metal frame 4 having the same shape as the anode metal frame 2, a cathode 3 attached to the cathode metal frame 4, and a separator 6 which is for isolating the anode 1 and the cathode 3 and is provided between the anode 1 and the cathode 3. The characteristic of the alkaline water electrolyzer 24 is in that the separator 6 is held in the state as shown in FIG. 2 by the electrolyzer gasket 17 which is sandwiched between the anode metal frame 2 and the cathode metal frame 4 and has a particular shape. That is, as shown in FIG. 2, by using the electrolyzer gasket 17 of the present invention, having the notch 20, the edge part of the separator 6 can easily be accommodated in a tight state in the gap formed between the electrolyzer gasket 17 and the anode metal frame 2. As a result, the configuration is made such that approximately the whole surface of the surface on the anode of the separator 6 is held in a state of being nearer to the anode 1. The above description is made on the example where the alkaline water electrolyzer 24 is configured in such a way as to bring the separator 6 nearer to the anode 1 side to hold the separator 6, as shown in FIG. 2, but the alkaline water electrolyzer 24 can also be configured in such a way as to bring the separator 6 nearer to the cathode 3 side to hold the separator 6 in a similar manner as described above, and the effects of the present invention can be obtained similarly in this case as well.

The anode metal frame 2 has an opening for forming the anode chamber in the central part. For example, the shape of the appearance is picture-frame-shaped, such as rectangular-shaped or circular (ring)-shaped. The anode 1 is attached at the opening of the anode metal frame 2. The anode 1 is composed of an expanded mesh, a perforated plate, a metal wire, or any one of electrically conductive electrode materials each having a shape similar to any one of the expanded mesh, the perforated plate, and the metal wire, and each having a large number of holes. The cathode metal frame 4 has the same shape as the anode metal frame and has a picture-frame shape, such as a rectangular shape or a circular shape, having an opening for forming a cathode chamber in the central part. The cathode 3 is attached at the opening of the cathode metal frame 4. The cathode 3 is composed of an expanded mesh, a perforated plate, a metal wire, or any one of electrically conductive electrode materials each having a shape similar to any one of the expanded mesh, the perforated plate, and the metal wire, and each having a large number of holes.

In the alkaline water electrolyzer of the first embodiment, a nickel-plated iron plate, nickel, or a nickel alloy is used for both of the anode 1 and the cathode 3 composed of an electrically conductive electrode material. Each of the anode metal frame 2 and the cathode metal frame 4 can also be formed with a nickel-plated iron plate, nickel, or a nickel alloy, which is the same as the material for the anode 1 and the cathode 3. When these are formed with the same material, the anode 1 and the cathode 3 can be attached by means of welding or the like to the surfaces on the separator 6 side of the anode metal frame 2 and the cathode metal frame 4, respectively.

The electrolyzer gasket 17 that characterizes the present invention is composed of a single picture-frame-shaped thin-plate-like frame having approximately the same shape as the anode metal frame 2 and the cathode metal frame 4. As shown in FIG. 2, the electrolyzer gasket 17 is sandwiched in a tight state between the anode metal frame 2 and the cathode metal frame 4. As shown in FIG. 1, the electrolyzer gasket 17 has the first surface 18 being in close contact with the anode metal frame 2 and the second surface 19 being in close contact with the cathode metal frame 4. The electrolyzer gasket 17 of the present invention is characterized in that the notch 20 having a particular shape is formed on any one of the first surface 18 and the second surface 19.

Hereinafter, the details on the notch 20 provided on the first surface 18 will be described with reference to FIG. 1 to FIG. 3 and FIG. 5. The notch 20 has a shape obtained by thinly scraping off, in a uniform thickness, a region including the edge from near the center of the picture-frame-shaped thin-plate-like frame of the electrolyzer gasket 17 to the edge on the anode chamber 15 side, and by the notch 20, a sunken surface having a difference in level with a particular thickness with respect to the first surface 18 is formed on the first surface 18.

As shown in FIG. 3, the difference in level (thickness) W formed by the notch 20 has approximately the same thickness as the thickness M of the separator 6. The electrolyzer gasket of the present invention has a structure in which the notch 20 having the above-described particular shape is formed, and therefore the edge part of the separator 6 can easily be accommodated in the gap formed between the notch 20 and the anode metal frame 2 and the held part of the separator 6 can be made into a tight state, as shown in FIG. 1. As shown in FIG. 2, by using the electrolyzer gasket 17 of the present invention, having the notch 20 having the above-described particular shape, for an electrolyzer, the separator 6 is held in a state where the whole surface facing the anode 1 is nearer to the surface of the anode 1. That is, by using the electrolyzer gasket of the present invention, the separator 6 is in contact with the surface of the anode 1 and held in a stable state on the anode 1 side without being held in the middle of the anode 1 and the cathode 3, which is different from the case where a gasket of the conventional techniques is used.

As described above, when the separator 6 is held using the electrolyzer gasket 17 of the present invention in an electrolyzer, the whole surface of one surface of the separator 6, excluding the edge part of the separator 6 accommodated in the notch 20, is held stably in a state of being fixed near the surface of the anode 1, as shown in FIG. 2, and therefore a bend, a wrinkle, or torsion is less likely to occur to the separator, which suppresses that unreasonable load is applied. For this reason, causing damage to the separator is suppressed, and therefore holding the separator in the electrolyzer stably in a normal state for a long period of time can be realized. As mentioned previously, the above description has been made by the example where the electrolyzer is configured in such a way as to bring the separator 6 nearer to the anode 1 side to hold the separator 6. Note that when the electrolyzer is configured in such a way as to bring the separator 6 nearer to the cathode 3 side to hold the separator 6 in a similar manner as those described above, the above-described effects of the present invention are obtained as well.

In the alkaline water electrolyzer 24 exemplified above, a corrosion resistant coating may be applied on the surface of the anode metal frame 2 or the cathode metal frame 4 in order to prevent crevice corrosion which occurs between the anode metal frame 2 or the cathode metal frame 4 and the electrolyzer gasket 17 sandwiched in a tight state although it depends on the type of the electrolyte to be used and the characteristics of the gases to be generated.

In addition, an elastic body having corrosion resistance against an electrolyte and an electrolytically generated gas is preferably used as a material for forming the electrolyzer gasket 17. For example, elastic bodies given below can appropriately be selected and used. Natural rubber (NR), styrene butadiene rubber (SBR), chloroprene rubber (CR), butadiene rubber (BR), acrylonitrile-butadiene rubber (NBR), silicone rubber (SR), ethylene-propylene rubber (EPT), ethylene-propylene-diene rubber (EPDM), fluorine rubber (FR), isobutylene-isoprene rubber (IIR), urethane rubber (UR), chlorosulfonated polyethylene rubber (CSM), and the like can be used.

The material for forming the separator 6 is not particularly limited as long as it is a separator having permeability to an aqueous solution. For example, an asbestos separator, non-woven fabric of PPS (polyphenylene sulfide), or a chemically resistant non-woven fabric immersed with a polymer, such as PTFE (polytetrafluoroethylene) or PSF (polysulfone), is suitably used. The thickness of the separator is about 100 µm to about 650 µm and is not particularly limited.

The electrolyzer gasket 17 of the present invention includes an original part 26 in the upper part (outer periphery side of thin-plate-like frame) where the notch is not formed and a notch-forming part 27 in the lower part (central side of thin-plate-like frame), as shown in FIG. 3. Further, the electrolyzer gasket 17 of the present invention, when set in an electrolyzer, has the first surface 18 being in close contact with the anode metal frame 2 and the second surface 19 being in close contact with the cathode metal frame 4. As previously described, on the first surface 18 of the electrolyzer gasket 17, the notch 20 designed in such a way as to have approximately the same thickness (difference in level) as the thickness of the separator 6 is provided at the notch-forming part 27 in a region from the boundary with the above-described original part 26 to the edge of the notch-forming part 27. The original part 26 in the upper part (on outer periphery side) from the region of the notch-forming part 27 of the first surface 18 forming the electrolyzer gasket 17, when set in the electrolyzer, is in a state of being in surface contact with the anode metal frame 2.

The signs for indicating the dimensions of each part of the electrolyzer gasket 17 of the present invention are shown in FIG. 2. Specific dimensions are appropriately set according to the sizes of individual electrolyzers. In addition, FIG. 3 shows the electrolyzer gasket 17 before being incorporated and set into an electrolyzer in a state where respective components are not in close contact with each other. Hereinafter, description will be made with reference to FIG. 3.

The length L of the notch 20 may appropriately be designed to the length to such an extent that the separator 6 can be held in accordance with the size of the electrolyzer and the electrode reaction area, and is, for example, about 5 to about 30 mm, and preferably 10 mm to 20 mm. The depth (also referred to as difference in level or thickness) W of the notch 20 may appropriately be set according to the thickness of the separator, and is, for example, about 0.1 to about 1.0 mm. In the present embodiment, the depth W of the notch 20 is approximately equal to the thickness M of the separator, and is, for example, about 0.5 mm. The length C of the electrolyzer gasket 17 (width C of frame) is about 20 mm to about 50 mm, the length A of the original part 26 is about 10 mm to about 40 mm, the length B of the notch-forming part 27 is about 5 mm to about 30 mm, and the thickness M of the separator is about 100 µm to about 650 µm. According to studies conducted by the present inventors, the ratio of the length A of the original part 26 to the length B of the notch-forming part 27 is preferably A:B=about 1:1 to 2:1 in order to sandwich the separator 6 in a tight state and in order not to allow liquid leakage to occur. However, the relationship is not limited to this because the relationship is influenced by the properties (such as strength, elasticity, and stretchability) of the gasket to be used.

On the other hand, the whole surface of the second surface 19 of the electrolyzer gasket 17 shown in FIG. 2 is in surface contact with the cathode metal frame 4, and there exists no gap between the electrolyzer gasket 17 and the anode metal frame 2 and between the electrolyzer gasket 17 and the cathode metal frame 4, and therefore an electrolyte in the electrolyzer 24 and an electrically generated gas does not leak outside from these contact surfaces.

The edge parts of both of the upper end and the lower end of the separator 6, after being inserted in the notch 20 of the electrolyzer gasket 17 (hereinafter, also simply referred to as "gasket"), are preferably compressed by a tie rod 25 (see FIG. 2, FIG. 4) or other pressing means, such as oil pressure means (not shown), from both sides of the anode metal frame 2 and the cathode metal frame 4. By configuring the electrolyzer gasket 17 in this way, the outer periphery part of the separator 6 is: accommodated in a tight state in the notch 20 of the gasket 17; more rigidly held by each side inside the notch 20 of the gasket 17; in a tight state by the upper part of the first surface 18 of the gasket 17, the whole surface of the second surface 19 of the gasket 17, the anode metal frame 2, and the cathode metal frame 4; and tightly sealed. For this reason, the leakage of an electrolyte and an electrolytically generated gas from the inside of the electrolyzer 24 to the outside can more surely be prevented.

When the electrolyzer gasket 17 is used for an electrolyzer, the whole surface of one surface of the separator 6, facing an electrode, is in a state of being in contact with the anode 1 and the anode metal frame 2, or being in contact with the cathode 3 and the cathode metal frame 4. That is, in the example shown in FIG. 2, the whole surface of surface on the anode of the separator 6 the outer periphery part (edge part) of which is accommodated in the notch 20 of the electrolyzer gasket 17 is in a state of being contact with the anode metal frame 2 and the anode 1. For this reason, with respect to the shapes of the cross sections of the contact parts, all of the contact part between the anode metal frame 2 and the gasket 17, the contact part between the surface on the anode of the separator 6 in the electrolyzer gasket 17 and the anode metal frame 2, and the contact part between the anode 1 and the separator 6 are in a state of being disposed and held in one straight line.

Accordingly, the separator 6 is not held unstably in the middle of the anode 1 and the cathode 3, and is held in a state of being along with the surface of the anode 1 (a state of being stacked) and in a state of one fixed plane. For this reason, during electrolysis operation, a bend, a wrinkle, or torsion does not occur in the separator 6, and an unreasonable load is not applied to the separator 6, so that causing damage to the separator 6 is remarkably suppressed. As a result, the separator 6 can be used stably for a long period of time, and therefore effective utilization of resources and an economical effect can be expected. Note that by setting the disposition at the time when the separator 6 is held to a state where a plurality of contact parts described above is held on one straight line, the rate of occurrence of a bending part on the separator 6 is lowered, so that the separator damage rate can be reduced. However, the state where the whole surface of one surface of the separator 6, excluding the held part, and the anode 1 or the cathode 3 are in contact with each other does not have to be configured depending on the position of installing the anode 1 or the cathode 3 as long as the gap therebetween is narrow.

As shown in FIG. 2, an anode chamber frame 22 that forms the anode chamber 15 is connected to the rear surface of the anode metal frame 2, and a cathode chamber frame 23 that forms the cathode chamber 16 is connected to the rear surface of the cathode metal frame 4. The anode chamber frame 22 and the cathode chamber frame 23 can be formed with the same material as the anode metal frame 2 and the cathode metal frame 4, respectively. Further, all of the anode 1, the anode metal frame 2, the anode chamber frame 22, the cathode 3, the cathode metal frame 4, and the cathode chamber frame 23 can also be formed with the same material, such as a nickel-plated iron plate, nickel, or a nickel alloy. Note that the first surface 18 or the second surface 19 of the electrolyzer gasket may be bonded to the anode metal frame 2 or the cathode metal frame 4, with which the first surface 18 or the second surface 19 is in contact, with an adhesive. In the case of a large-scale real machine, cell assembly may be performed standing the cell on the spot, and therefore use of an adhesive is effective in such a case. On the other hand, in the case of a small-sized machine, cell assembly is often performed laying it on its side, and in this case, an adhesive is unnecessary.

Second Embodiment

In the first embodiment, the description has been made on the example where the notch 20 is provided at the notch-forming part 27 of the first surface 18 of the gasket 17, wherein the first surface 18 is in contact with the anode metal frame 2. In the second embodiment (not shown), the notch 20 is formed by providing the notch-forming part 27 at the second surface 19 of the gasket 17, wherein the second surface 19 is on the opposite side of the first surface 18 and is in contact with the cathode metal frame 4. In this example, the original part 26 which is in the upper part from the center of the second surface 19 of the gasket 17 is brought into surface contact with the cathode metal frame 4, and on the other hand, the whole surface of the first surface 18 of the gasket 17 is brought into surface contact with the anode metal frame 2. In this case, the configuration is made such that the cathode metal frame 4 and the cathode 3 are disposed on the same plane. For this reason, the whole surface of the separator 6 whose edge part is accommodated and held in the notch 20 provided on the cathode of the gasket 17 is in a state of being in contact with the cathode metal frame 4 and the cathode 3, and the separator 6 is held in a state of one plane such that the separator 6 is fixed in a state of being along the surface of the cathode 3 (in a state where the separator 6 is stacked on the surface).

Accordingly, also in the case of the second embodiment as well as the first embodiment, the central part of the separator 6 is not held in an unstable state in the middle of the anode 1 and the cathode 3 and is linearly held in a contact state along with the surface of the cathode 3, which is different from the cases shown in FIGS. 6 to 8 where a conventional gasket is used. For this reason, torsion does not occur to the separator 6, an unreasonable load is not applied, so that the separator 6 can be used stably for a long period of time without causing damage to the separator 6.

Third Embodiment

In the third embodiment, in addition to the configuration of the first embodiment or the second embodiment, an anode obtained by covering the surface on the separator 6 side of the anode 1 with an anode-activating catalyst is used as the anode 1, and a cathode obtained by covering the surface on the separator 6 side of the cathode 3 with a cathode-activating catalyst is used as the cathode 3. By configuring the electrolyzer in this way, enhancement of the performance of the electrolyzer can be achieved. Further, in order to enhance the performance of the electrolyzer of the present invention, it is preferable to attach, to the surface of the anode 1 on the separator 6 side, an anode fine mesh 28 on which an activated anode coating is applied and/or attach, to the surface of the cathode 3 on the separator 6 side, a cathode fine mesh 29 on which a activated cathode coating is applied.

Figure 4:
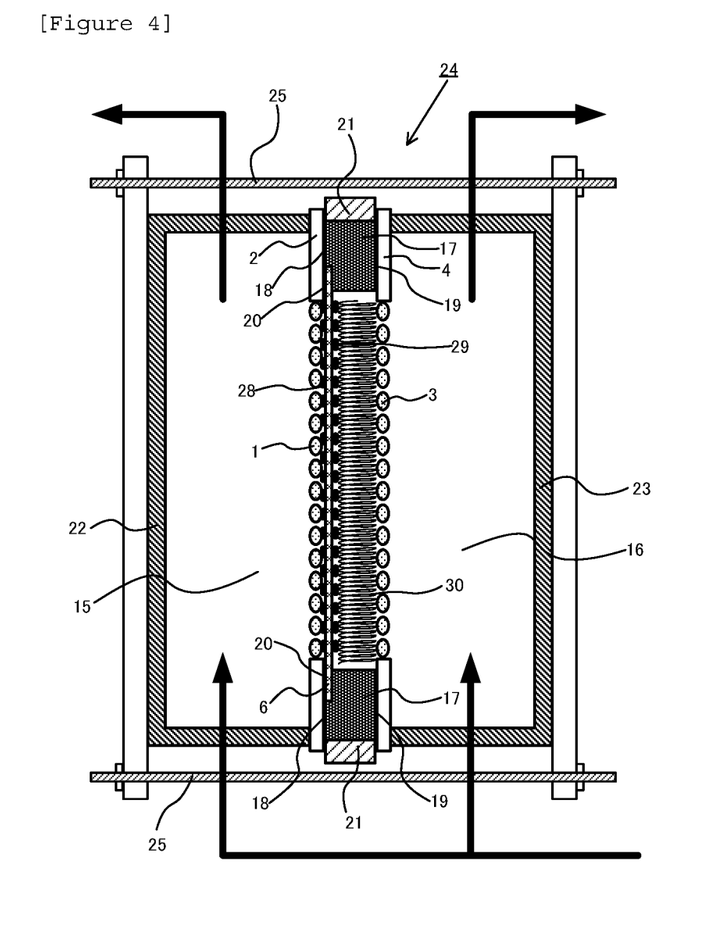
FIG. 4 is a schematic diagram for explaining another example of an electrolyzer using an electrolyzer gasket of the present invention.

In order to achieve further enhancement of the performance of the electrolyzer, a spring material 30 is preferably attached between the anode fine mesh 28 and the anode 1 and/or between the cathode fine mesh 29 and the cathode 3 to achieve a zero gap between the anode 1 and the cathode 3. As the spring material, a cushion coil of a nickel base material can suitably be used. FIG. 4 shows an example of the electrolyzer in which the spring material 30 is attached between the cathode fine mesh 29 and the cathode 3. By configuring the electrolyzer as shown in FIG. 4, the zero gap between the anode 1 and the cathode 3 is achieved, so that further enhancement of the performance of the electrolyzer is achieved.

Fourth Embodiment

The electrolyzer gasket of the present invention is suitable for an alkaline water electrolyzer but can also be applied to an electrolyzer for brine electrolysis and other electrolyzers, such as electrolyzers for pure water electrolysis, electrolysis of unpurified water, bromide aqueous solution electrolysis, hydrochloric acid aqueous solution electrolysis, and sulfuric acid aqueous solution electrolysis. To apply the present invention to a brine electrolyzer, a cation exchange membrane is used as the separator 6, the anode chamber 15 and the cathode chamber 16 of the electrolyzer are isolated by the cation exchange membrane, a sodium chloride solution is used as an anolyte, and a caustic alkali metal aqueous solution is adopted as a catholyte.

Fifth Embodiment

Further, the electrolyzer gasket and the electrolyzer of the present invention can also be applied in a pressurization system. Note that in the case of the pressurization system, both of the anode chamber and the cathode chamber are pressurized. On this occasion, cathode pressurization is preferable as operation management because there is a tendency that the purity of hydrogen collected from the cathode is increased by making the pressure on the cathode a little higher than the pressure on the anode to perform anode pressurization control. On the other hand, the cathode pressurization depends on the type of separator, and when a separator which easily permeates an electrolyte is used, weak cathode pressurization as weak as a water column of about 10 cm-$H_2O$, or the same pressure is adopted.

Sixth Embodiment

Furthermore, the electrolyzer gasket and the electrolyzer of the present invention can also be applied not only to a unipolar system electrolyzer but also a bipolar system electrolyzer.

INDUSTRIAL APPLICABILITY

According to the present invention, a separator can be accommodated and held inside an electrolyzer using a single gasket by a simple attaching handling, and leakage of an electrolyte and an electrolytically generated gas from the inside of the electrolyzer can surely be prevented. Further, by adopting a configuration having a notch of a particular form, the separator can be held at a position being in contact with and along with an electrode, and therefore the separator can be used stably for a long period of time without bending the separator right and left during electrolysis operation and without causing any damage to the separator. The electrolyzer gasket of the present invention can be applied to various electrolyzers, and therefore utilization thereof in wide fields is expected.

REFERENCE SIGNS LIST

1: Anode
2: Anode metal frame
3: Cathode
4: Cathode metal frame
5: O-ring
6: Separator
7: Anode gasket
8: Cathode gasket
9: Electrolyzer gasket (conventional technique)
10: First surface (conventional technique)
11: Second surface (Conventional technique)
12: Slit
13: Original part
14: Slit-forming part
15: Anode chamber
16: Cathode chamber
17: Electrolyzer gasket
18: First surface
19: Second surface
20: Notch
21: Stopper
22: Anode chamber frame
23: Cathode chamber frame
24: Alkaline water electrolyzer
25: Tie rod
26: Original part
27: Notch-forming part
28: Anode fine mesh
29: Cathode fine mesh
30: Spring material

The invention claimed is:

1. An electrolyzer comprising:
an electrolyzer gasket for the electrolyzer, the electrolyzer gasket comprising: a single frame in a shape of a picture frame in a plate form, wherein the electrolyzer gasket is incorporated in the electrolyzer;
an anode;
a cathode;
a separator that is in a sheet shape and isolates the anode and the cathode from each other, wherein the separator is held by a single gasket that is the electrolyzer gasket;
an anode metal frame in a shape of a picture frame, the anode metal frame having an opening in a central part thereof and receiving therein the anode, and the anode metal frame, the anode, and an anode chamber frame forming an anode chamber; and
a cathode metal frame having the same shape as the anode metal frame, the cathode metal frame having an opening in central part thereof and receiving therein the cathode, and the cathode metal frame, the cathode, and a cathode chamber frame forming a cathode chamber, so that the electrolyzer gasket is sandwiched between the anode metal frame and the cathode metal frame,
wherein the electrolyzer gasket has substantially the same shape as the anode metal frame and the cathode metal frame,
the picture-frame-shaped electrolyzer gasket has:
a first surface being in contact with the anode metal frame, and
a second surface being in contact with the cathode metal frame, so as to prevent leakage of an electrolyte or an electrolytically generated gas from the electrolyzer, and
the electrolyzer gasket has a structure obtained by forming a notch by thinly scraping off a region of the gasket on the first surface or the second surface, the notch having substantially the same width as a thickness of the separator such that upper and lower edges of the separator are tightly accommodated in the notch, and that the separator is held in the notch by:
the anode metal frame in which a first surface of the separator that faces the anode is in contact with and held by the anode metal frame if the notch is formed on the first surface of the electrolyzer gasket, or
the cathode metal frame in which a second surface of the separator that faces the cathode is in contact with and held by the cathode metal frame if the notch is formed on the second surface of the electrolyzer gasket.

2. The electrolyzer according to claim 1,
wherein the gasket further comprises a gasket stopper having an electrical insulation property, and
the gasket stopper is attached onto an outer peripheral surface of the electrolyzer gasket.

3. The electrolyzer according to claim 1, wherein the electrolyzer gasket is formed of a material comprising an elastic body having corrosion resistance property against an electrolyte placed in the electrolyzer and gas generated electrolytically therein.

4. The electrolyzer according to claim 1, wherein
(i) the anode comprises a coating of an anode activating catalyst on a separator side thereof, or comprises an anode mesh having the coating of the anode activating catalyst, the anode mesh being attached to the separator side of the anode, or (ii) the cathode comprises a coating of a cathode activating catalyst on a separator side thereof, or comprises a cathode mesh having the coating of the cathode activating catalyst, the cathode mesh being attached to the separator side of the cathode, or the electrolyzer comprises both the anode of the (i) and the cathode of the (ii).

5. The electrolyzer according to claim 4, wherein a spring material is attached to at least one position selected from the group consisting of a position between the anode mesh and the anode and a position between the cathode mesh and the cathode so that the spring removes gap between the anode mesh and the separator, and a gap between the cathode mesh and the separator.

6. The electrolyzer according to claim 1,
wherein each of the anode and the cathode comprises a material each independently selected from the group consisting of (a) an expanded mesh, (b) a perforated plate, (c) a metal wire, and (d) an electrically conductive electrode porous material having a shape of the expanded mesh, a shape of the perforated plate, or a shape of the metal wire.

7. The electrolyzer according to claim 1, wherein
the anode chamber frame is connected to a rear surface of the anode metal frame, and
the cathode chamber frame is connected to a rear surface of the cathode metal frame.

8. The electrolyzer according to claim 7, wherein the anode metal frame is formed as a part of the anode chamber frame, and the cathode metal frame is formed as a part of the cathode chamber frame.

9. The electrolyzer according to claim 1,
wherein the electrolyzer further comprises: a mesh attached to the anode, or a mesh attached to the cathode, or both,
the separator is held in a state in which a whole surface of one surface of the separator other than a portion thereof accommodated in the notch of the gasket, is in contact with the anode or the anode mesh attached to the anode, or is held in a state in which a whole surface of one surface of the separator other than a portion thereof accommodated in the notch, is in contact with the cathode or the cathode mesh attached to the cathode.

10. The electrolyzer according to claim 1, wherein
each of the anode, the anode metal frame, the anode chamber frame, the cathode, the cathode metal frame, and the cathode chamber frame comprises a material comprising at least one material selected from the group consisting of nickel, stainless steel, iron, and alloys thereof,
the separator comprises a porous separator having aqueous solution permeability,
each of electrolytes to be introduced into the anode chamber and the cathode chamber respectively is a caustic alkali metal aqueous solution, and
the electrolyzer is an alkaline water electrolyzer.

11. The electrolyzer according to claim 1, wherein
each of the anode, the anode metal frame, and the anode chamber frame comprises a material comprising titanium or a titanium alloy,
each of the cathode, the cathode metal frame, and the cathode chamber frame comprises a material comprising at least one material selected from the group consisting of nickel, stainless steel, iron, and alloys thereof,
the separator comprises a cation exchange membrane,
an electrolyte to be introduced into the anode chamber comprises an anolyte, and an electrolyte-introduced into the cathode chamber comprises a catholyte,
the catholyte comprises a caustic alkali metal aqueous solution,
the anolyte comprises an alkali metal halide aqueous solution, and
the electrolyzer is a brine electrolyzer.

12. The electrolyzer according to claim 1, wherein the electrolyzer performs electrolysis while pressurizing an electrolyte.

13. The electrolyzer according to claim 1,
wherein the first surface of the gasket is bonded, with an adhesive, to the anode frame that is in contact with the first surface, or the second surface of the gasket is bonded to the cathode frame that is in contact with the second surface.

14. The electrolyzer according to claim 1, wherein the electrolyzer comprises only one electrolyzer gasket.

* * * * *